UNITED STATES PATENT OFFICE.

FREDERICK A. VOGT, OF PHILADELPHIA, PENNSYLVANIA.

PROCESS OF CANNING SCRAPPLE.

1,035,502.  Specification of Letters Patent.  Patented Aug. 13, 1912.

No Drawing.  Application filed May 20, 1912. Serial No. 698,432.

*To all whom it may concern:*

Be it known that I, FREDERICK A. VOGT, a citizen of the United States, residing in the city and county of Philadelphia, State of Pennsylvania, have invented a new and useful Process of Canning Scrapple, of which the following is a specification.

My invention relates to a new and useful process for canning scrapple, which consists in subjecting the same to a certain degree of heat in order to drive off all liquid, moisture and aqueous vapors, then increasing the heat to a higher temperature to drive off any volatile oils and gases arising from the fats, and then in further increasing the temperature to drive off any other gases or free alcoholic vapors, and then allowing the temperature to lower.

I have found in practice that in the ordinary methods of canning, it has been impossible to place the scrapple in such condition that it will be retained in the proper condition for any length of time. This is due to several causes, among others being that where steam or wet heat has been employed, the mixture is not properly dried and further by reason of the corn meal and rye flour, which are in the scrapple, with other ingredients, that fermentation occurs when these two articles are mixed with water. By my process I am enabled to thoroughly dry the mixture and to control the fermentation in order that the scrapple when canned will retain its proper condition for many months, the advantages of which are evident.

In carrying out my process, the scrapple is first mixed and finished as to its proper ingredients and constituents and is then in liquid form. The mixture is then filled into tin cans, which are sealed with a tin lid, a small vent hole being left open at the top of the can. The cans are then placed into an oven heated preferably by gas or other fuel which is adapted to provide a dry heat, and said oven is provided with a suitable thermometer or other heat indicator in order that the various degrees of heat may be carefully observed and the steps of my process carried out. After the filled cans are placed in the oven, the temperature thereof is raised to about 230° Fahr. and this temperature is maintained for substantially one hour and a half. The purpose of retaining the heat at this temperature and subjecting the scrapple thereto is to drive off all liquid and moisture and aqueous vapors. At this temperature of 230° fermentation has been going on and alcoholic gases are being given off and after the time mentioned, the temperature of the oven is raised to about 350° Fahr. The purpose of this increased heat is to prevent all fermentation and also to break up any chemical and physical changes that may be brought about by the gases expelled from the water and which mixed with the corn meal and rye flour bring about fermentation. The temperature of the 350° Fahr. is maintained for about half hour, the purpose of which is to drive off any volatile oils and gases arising from the fats, and after this time, the temperature is increased to 400° Fahr. and maintained at that temperature for about fifteen minutes for the purpose of driving off any other gases or free alcoholic vapors. After the scrapple has been subjected to the temperature of about 400° Fahr. for the time mentioned, it is then allowed to cool for about fifteen minutes and the vent hole at the top of the can is then soldered up and the cans left to get cold, and when cool a vacuum is formed, which will preserve the contents indefinitely and will prevent it from becoming rancid or sour.

I have found that the steps of the process are best carried out at the degrees mentioned and at the times specified but it will be evident that slight variations one way or the other may occur in the temperature and the time to which the mixture is subjected to the various temperatures may be slightly varied one way or the other without departing from the spirit of my invention.

Having thus described my invention, what I claim as new and desire to secure by Letters Patent, is:—

1. The process of canning scrapple which consists in subjecting the same to dry heat at a relatively high temperature for a period of time to drive off the water and moisture and aqueous vapors, then raising the temperature to a considerably higher degree to drive off any volatile oils and gases and to prevent all fermentation, then still further increasing the temperature for a relatively short period of time, and then allowing the mixture to cool and hermetically sealing the mixture in a suitable vessel.

2. The process of canning scrapple which consists in subjecting the same in a suitable receptacle by a dry heat, to a temperature of substantially 230°, then raising the temperature to about 350°, then raising the temperature to about 400°, then allowing the mixture to cool, and then hermetically sealing the vessel in which the mixture is contained.

FREDERICK A. VOGT.

Witnesses:
JACOB MATHAY,
J. O. EBERHART, Jr.